(12) United States Patent
Roberts et al.

(10) Patent No.: US 12,038,531 B2
(45) Date of Patent: Jul. 16, 2024

(54) SYSTEMS AND METHODS FOR DETECTING CARRIED OBJECTS TO ADAPT VEHICLE ACCESS

(71) Applicant: Toyota Connected North America, Inc., Plano, TX (US)

(72) Inventors: Simon P. Roberts, Celina, TX (US); Yang Ding, Montreal (CA); Daniel W. Reaser, Oak Point, TX (US); Christopher J. Macpherson, Plano, TX (US); Keaton Khonsari, Dallas, TX (US); Derek A. Thompson, Dallas, TX (US); Sergei I. Gage, Redford, MI (US); Jessica May, Bedford, TX (US)

(73) Assignee: Toyota Connected North America, Inc., Plano, TX (US)

( * ) Notice: Subject to any disclaimer, the term of this patent is extended or adjusted under 35 U.S.C. 154(b) by 412 days.

(21) Appl. No.: 17/401,937

(22) Filed: Aug. 13, 2021

(65) Prior Publication Data

US 2023/0034583 A1    Feb. 2, 2023

Related U.S. Application Data

(60) Provisional application No. 63/227,658, filed on Jul. 30, 2021.

(51) Int. Cl.
*G01S 7/41*    (2006.01)
*B60R 25/01*   (2013.01)
(Continued)

(52) U.S. Cl.
CPC .............. *G01S 7/412* (2013.01); *B60R 25/01* (2013.01); *B60R 25/1004* (2013.01);
(Continued)

(58) Field of Classification Search
CPC .......... G01S 7/412; G01S 7/415; G01S 7/417; G01S 13/723; B60R 25/01; B60R 25/1004; B60R 25/24; B60R 25/31; G05B 13/0265
See application file for complete search history.

(56) References Cited

U.S. PATENT DOCUMENTS

| 7,401,807 B2 | 7/2008 | Breed et al. |
| 10,159,435 B1 | 12/2018 | Brankovic |

(Continued)

FOREIGN PATENT DOCUMENTS

| CN | 106115282 A | 11/2016 |
| JP | 2013007171 A | 1/2013 |
| WO | 2020037168 A1 | 2/2020 |

OTHER PUBLICATIONS

Alizadeh et al., "Low-cost low-power in-vehicle occupant detection with mm-wave FMCW radar," 2019 IEEE Sensors, Aug. 12, 2019, pp. 1-4.

(Continued)

*Primary Examiner* — James R Hulka
*Assistant Examiner* — Noah Yi Min Zhu
(74) *Attorney, Agent, or Firm* — Christopher G. Darrow; Darrow Mustafa PC

(57) ABSTRACT

System, methods, and other embodiments described herein relate to adapting vehicle access by detecting a person carrying an object. In one embodiment, a method includes detecting a person near a vehicle for gaining access. The method also includes scanning the person for an object using a radar of the vehicle, wherein information from the radar indicates densities of the person and the object. Upon detecting the object using the densities, the method also includes adapting the access to a compartment of the vehicle.

20 Claims, 5 Drawing Sheets

(51) Int. Cl.
  *B60R 25/10* (2013.01)
  *B60R 25/24* (2013.01)
  *B60R 25/31* (2013.01)
  *G01S 13/72* (2006.01)
  *G05B 13/02* (2006.01)

(52) U.S. Cl.
  CPC .............. *B60R 25/24* (2013.01); *B60R 25/31* (2013.01); *G01S 7/415* (2013.01); *G01S 7/417* (2013.01); *G01S 13/723* (2013.01); *G05B 13/0265* (2013.01)

(56) References Cited

U.S. PATENT DOCUMENTS

| | | | |
|---|---|---|---|
| 10,527,428 B1* | 1/2020 | Mehta | G06Q 10/08 |
| 10,875,468 B2 | 12/2020 | Saito et al. | |
| 2019/0143936 A1* | 5/2019 | Abel Rayan | B60R 25/10 701/2 |
| 2019/0346531 A1* | 11/2019 | Apostolos | B60R 25/209 |
| 2020/0193368 A1 | 6/2020 | Bhatia et al. | |
| 2020/0231106 A9 | 7/2020 | Sweeney | |
| 2020/0307721 A1* | 10/2020 | Patel | G06Q 10/0836 296/24.44 |
| 2021/0005035 A1 | 1/2021 | Tsujimura et al. | |
| 2021/0168335 A1 | 6/2021 | Kanaoka et al. | |
| 2021/0192199 A1* | 6/2021 | Bagwell | G06V 20/58 |
| 2021/0394571 A1* | 12/2021 | Minino | G05D 1/0088 |
| 2022/0017043 A1* | 1/2022 | Breynaert | B60R 25/01 |
| 2022/0043108 A1* | 2/2022 | Lavian | G01S 7/032 |
| 2023/0031130 A1* | 2/2023 | Birenbaum | G06F 11/3664 |

OTHER PUBLICATIONS

Steinhauer et al., "Millimeter-Wave-Radar Sensor Based on a Transceiver Array for Automotive Applications," IEEE Transactions on Microwave Theory and Techniques, vol. 56, No. 2, Feb. 2008, pp. 261-269.

Baird et al., "Principal component analysis-based occupancy detection with ultra wideband radar," 2017 IEEE 60th International Midwest Symposium on Circuits and Systems (MWSCAS), 2017, pp. 1573-1576.

Stephen Shankland, "Apple AirTags use UWB wireless tech. Here's how ultra wideband makes your life easier," found at https://www.cnet.com/tech/mobile/apple-airtags-use-uwb-wireless-tech-heres-how-ultra-wideband-makes-your-life-easier/, Apr. 30, 2021, 7 pages.

* cited by examiner

SYSTEMS AND METHODS FOR DETECTING CARRIED OBJECTS TO ADAPT VEHICLE ACCESS

CROSS-REFERENCE TO RELATED APPLICATIONS

This application claims benefit of U.S. Provisional Application No. 63/227,658, filed on Jul. 30, 2021, which is herein incorporated by reference in its entirety.

TECHNICAL FIELD

The subject matter described herein relates, in general, to adapting vehicle access, and, more particularly, to detecting a person carrying objects and controlling the vehicle access accordingly.

BACKGROUND

Controlling vehicle access involves unlocking a door or opening a trunk. Systems may automatically control vehicle access by detecting signals from a wireless device. These systems may be programmed for operator convenience while maintaining a minimum security level. For example, the system may unlock cabin doors and a trunk according to different keys carried by a person. Unlocking may also be performed when wireless keys are proximate to the vehicle for increased security.

In various implementations, access can be controlled using context to enhance convenience. For example, a system can detect a kick by a person under a bumper to open a trunk. A person with full hands may use this access type. However, such systems may erroneously trigger access due to limited detection capabilities. Similarly, other systems lack components or detection models to unlock cabin doors according to context. For example, such systems can only rely on signal strength to detect proximity for the vehicle access.

SUMMARY

In one embodiment, example systems and methods relate to adapting vehicle access by detecting a person carrying an object. In various implementations, a system controlling vehicle access unlocks compartments with minimal user context, thereby reducing convenience. For example, a person carrying a voluminous object may require opening a trunk instead of unlocking a front door. As such, a person inconveniently uses a key press on a digital device for more contextual access. Therefore, in one embodiment, a detection system detects and scans a person approaching a vehicle using radar. From the scan, the detection system may identify the density of the person and any carried objects. The system distinguishes the person from an object according to different densities. As such, the vehicle may unlock and open a compartment according to detected objects associated with the person. For example, the vehicle opens a power liftgate when the person is detected as carrying a voluminous box, thereby improving convenience.

Furthermore, the detection system may estimate depth using radar information and a machine learning (ML) model. In one approach, the detection system uses returned millimeter waves and the estimated depth to compute volume. The detection system may compare this information to patterns of people carrying objects towards the vehicle. Through this tracking, the detection system may distinguish various objects by movement, size, and density. In addition, the detection system may identify object types according to occlusion characteristics in a foreground of the person. Thus, the detection system uses sensors to identify a person carrying different objects and adapt vehicle access accordingly, thereby improving convenience.

In one embodiment, a detection system for adapting vehicle access by detecting a person carrying an object is disclosed. The detection system includes a processor and a memory communicably coupled to the processor. The memory stores instructions that, when executed by the processor, cause the processor to detect a person near the vehicle to gain the access. The instructions also include instructions to scan the person for an object using a radar of the vehicle, wherein information from the radar indicates densities of the person and the object. The instructions also include instructions, upon detection of the object using the densities, to adapt the access to a compartment of the vehicle.

In one embodiment, a non-transitory computer-readable medium for adapting vehicle access by detecting a person carrying an object and including instructions that when executed by a processor cause the processor to perform one or more functions is disclosed. The instructions include instructions to detect a person near the vehicle to gain the access. The instructions also include instructions to scan the person for an object using a radar of the vehicle, wherein information from the radar indicates densities of the person and the object. The instructions also include instructions, upon detection of the object using the densities, to adapt the access to a compartment of the vehicle.

In one embodiment, a method for adapting vehicle access by detecting a person carrying an object is disclosed. In one embodiment, the method includes detecting a person near a vehicle for gaining access. The method also includes scanning the person for an object using a radar of the vehicle, wherein information from the radar indicates densities of the person and the object. Upon detecting the object using the densities, the method also includes adapting the access to a compartment of the vehicle.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Systems, methods, and other embodiments associated with adapting vehicle access by detecting a person carrying an object are disclosed herein. In various implementations, systems for vehicle access lack the capability to unlock compartments contextually. For example, a vehicle automatically gives operator door access for a person carrying a voluminous object. Therefore, in one embodiment, a detection system uses radar to detect a person near a vehicle. A radar system may emit high-frequency waves (e.g., millimeter waves (mmW) or ultra-wideband (UWB) waves) to detect density of a person nearby. In particular, the detection system may search around the vehicle for a mass having density similar to human tissue.

Moreover, the detection system may scan a detected person by measuring returned high-frequency waves. For example, the radar system can measure returned frequency-modulated continuous waves (FMCW), such as mmWs, using transceivers in a vehicle cabin to determine whether the person is carrying an object (e.g., cargo). In addition, the detection system may estimate depth from the radar measurements using a ML model (e.g., a convolutional neural network (CNN)). The detection system may accordingly use the estimated depth to compute volumetric pixels (voxels) that include location, size, and amplitude information for a person and an object. In one approach, the voxel amplitude represents object density computed by the detection system.

With the depth perception, grouped voxels or depth points can represent three-dimensional (3D) depth that the detection system uses for identifying the person and the object. In particular, the detection system may group the 3D depth points to detect and track a person carrying an object. For example, changing position of depth points towards the vehicle having consistent intensity can indicate an approaching person with cargo.

In various implementations, the detection system can also combine density detection with estimated depth. For example, a cubical object having 1 gram(g)/centimeter(cm)$^3$ density occluding the front of a larger and thinner rectangle having a 985 kilogram(kg)/meter(m)$^3$ density can be a person carrying a box. Upon detection, the system labels occlusions by type according to shape and density. A type may be a box, a child, or a pet. As additional verification and convenience, the detection system may also compare the movement of the detected person and object to patterns. For example, a person carrying a voluminous box can have a certain pace and walk towards the liftgate or trunk. Regarding access, the detection system intuitively adapts access to a compartment when detecting a person carrying cargo. For example, the detection system may unlock a rear-cabin door or open a power liftgate for the person carrying a voluminous box. Accordingly, the detection system uses density and depth perception to contextually give vehicle access, thereby improving overall perception.

Figure 1:
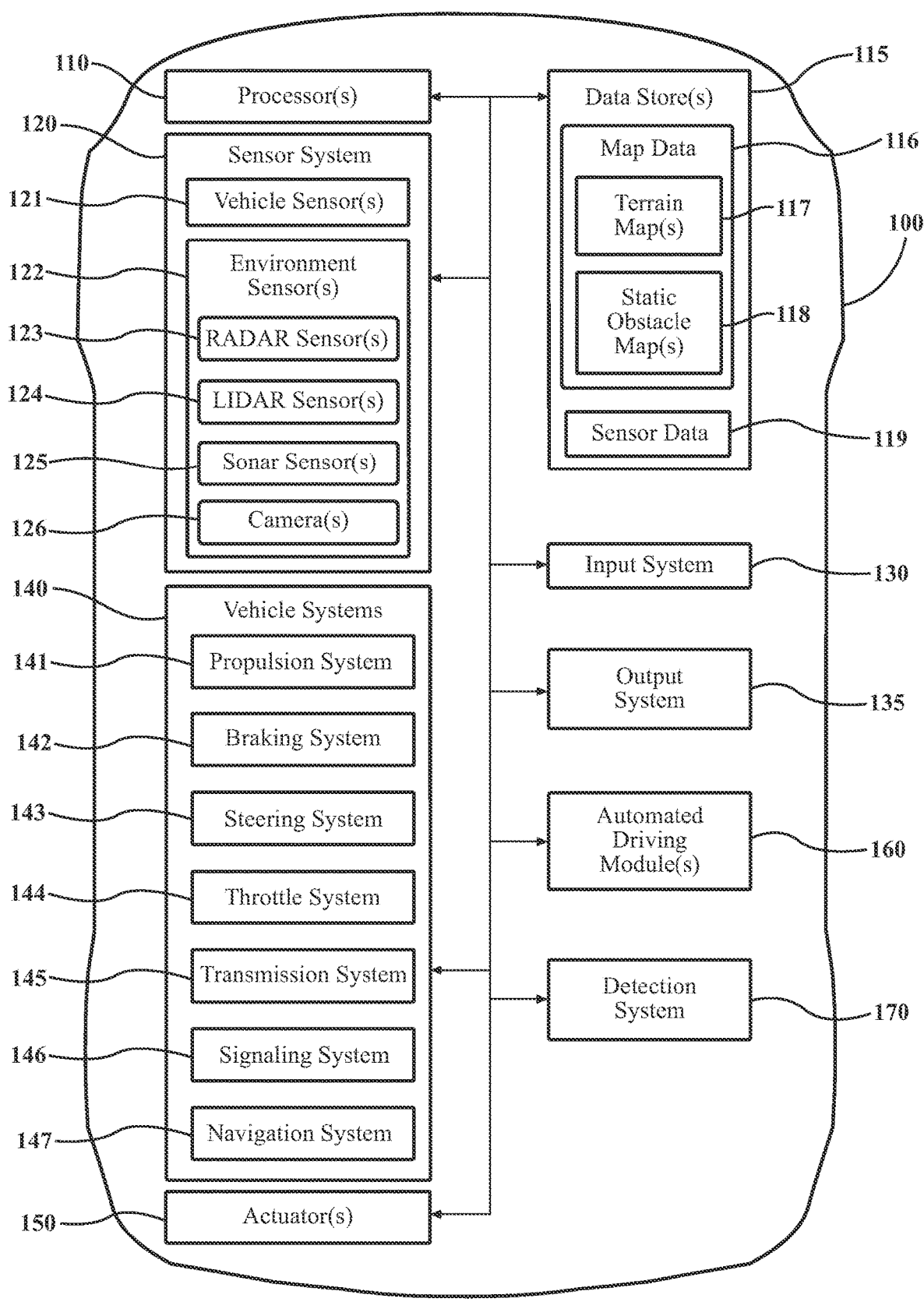
FIG. 1 illustrates one embodiment of a vehicle within which systems and methods disclosed herein may be implemented.

Referring to FIG. 1, an example of a vehicle 100 is illustrated. As used herein, a "vehicle" is any form of powered transport. In one or more implementations, the vehicle 100 is an automobile. While arrangements will be described herein with respect to automobiles, it will be understood that embodiments are not limited to automobiles. In some implementations, the detection system 170 can be used for consumer electronics (CE), mobile devices, robotic devices, drones, and so on. In other implementations, the vehicle 100 is a robotic device or form of transport and thus benefits from the functionality discussed herein associated with detecting a person carrying objects and controlling vehicle access accordingly.

The vehicle 100 also includes various elements. It will be understood that in various embodiments, the vehicle 100 may have less than the elements shown in FIG. 1. The vehicle 100 can have any combination of the various elements shown in FIG. 1. Furthermore, the vehicle 100 can have additional elements to those shown in FIG. 1. In some arrangements, the vehicle 100 may be implemented without one or more of the elements shown in FIG. 1. While the various elements are shown as being located within the vehicle 100 in FIG. 1, it will be understood that one or more of these elements can be located external to the vehicle 100. Furthermore, the elements shown may be physically separated by large distances. For example, as discussed, one or more components of the disclosed system can be implemented within a vehicle while further components of the system are implemented within a cloud-computing environment or other system that is remote from the vehicle 100.

Some of the possible elements of the vehicle 100 are shown in FIG. 1 and will be described along with subsequent figures. However, a description of many of the elements in FIG. 1 will be provided after the discussion of FIGS. 2-5 for purposes of brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those of skill in the art, however, will understand that the embodiments described herein may be practiced using various combinations of these elements. In either case, the vehicle 100 includes a detection system 170 that is implemented to perform methods and other functions as disclosed herein relating to detecting a person carrying objects and controlling vehicle access accordingly. The detection system 170, in various implementations, can use the radar sensor(s) 123 to emit and measure returned mmW or UWB waves. In particular, the dispersion properties for mammal tissue or bone of high-frequency (e.g., 60-70 GHz) radio waves allow mmW systems to distinguish varying materials from humans in detail. Accordingly, the detection system 170 may use mmW radar for detecting a person and object densities.

Figure 2:
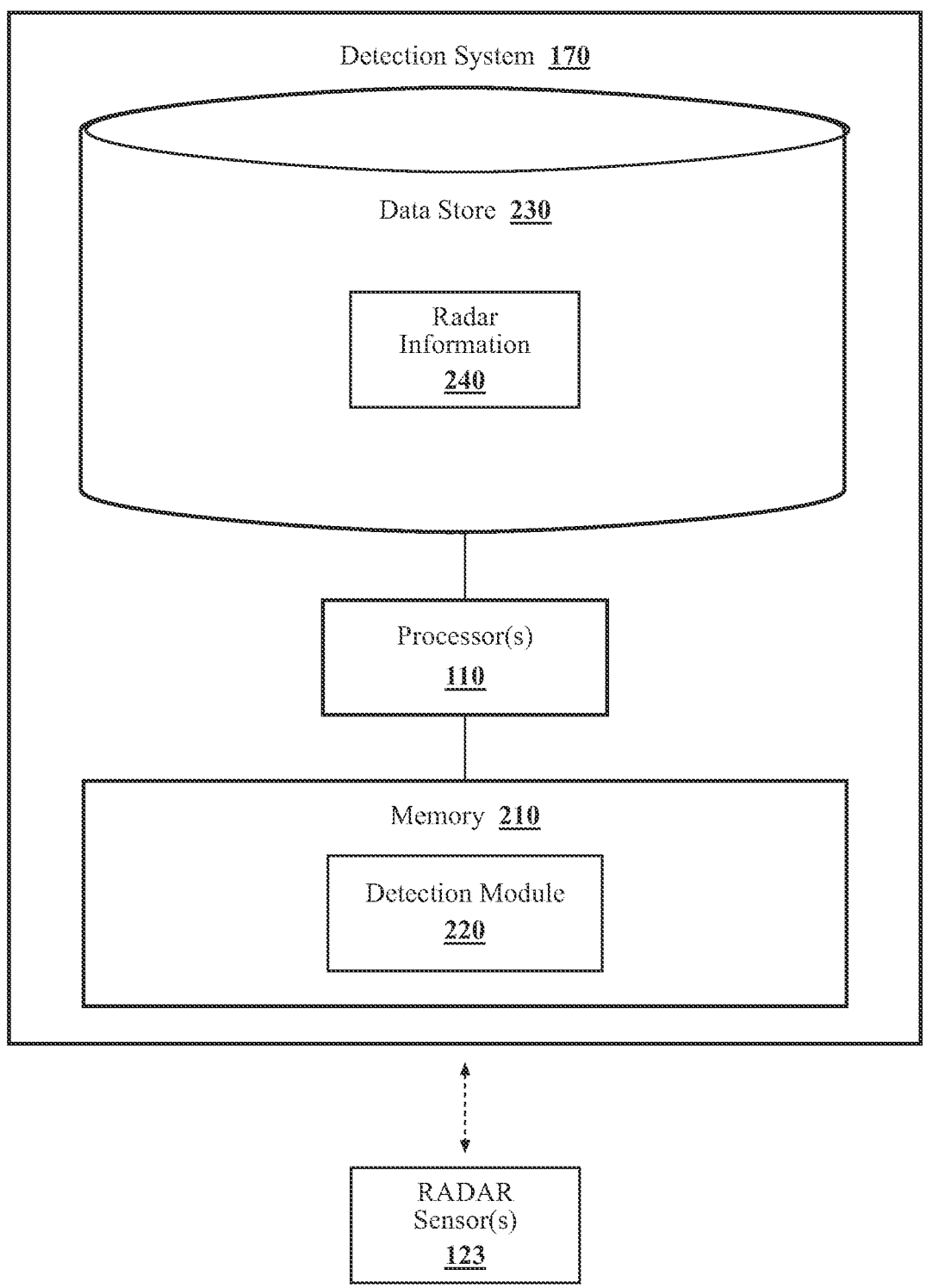
FIG. 2 illustrates one embodiment of a detection system that is associated with adapting vehicle access by detecting a person carrying an object.

With reference to FIG. 2, one embodiment of the detection system 170 of FIG. 1 is further illustrated. The detection system 170 is shown as including a processor(s) 110 from the vehicle 100 of FIG. 1. Accordingly, the processor(s) 110 may be a part of the detection system 170, the detection system 170 may include a separate processor from the processor(s) 110 of the vehicle 100, or the detection system 170 may access the processor(s) 110 through a data bus or another communication path. In one embodiment, the detection system 170 includes a memory 210 that stores a detection module 220. The memory 210 is a random-access memory (RAM), read-only memory (ROM), a hard-disk drive, a flash memory, or other suitable memory for storing the detection module 220. The detection module 220 is, for example, computer-readable instructions that when executed by the processor(s) 110 cause the processor(s) 110 to perform the various functions disclosed herein.

The detection system 170 as illustrated in FIG. 2 is generally an abstracted form of the detection system 170 as may be implemented between the vehicle 100 and a cloud-computing environment. The detection module 220 generally includes instructions that function to control the processor(s) 110 to receive data inputs from one or more sensors of the vehicle 100. The inputs are, in one embodiment, observations of one or more objects in an environment proximate to the vehicle 100 and/or other aspects about the surroundings. As provided for herein, the detection module 220 acquires information from sensors such as a radar sensor(s) 123 and other sensors as may be suitable for identifying vehicles, objects, and locations thereof. As explained below, in various implementations, the radar sensor(s) 123 can emit mmWs, UWB waves, high-frequency radio waves, and so on for depth estimation and object detection.

Moreover, in one embodiment, the detection system 170 includes a data store 230. In one embodiment, the data store 230 is a database. The database is, in one embodiment, an electronic data structure stored in the memory 210 or another data store and that is configured with routines that can be executed by the processor(s) 110 for analyzing stored data, providing stored data, organizing stored data, and so on. Thus, in one embodiment, the data store 230 stores data used by the detection module 220 in executing various functions. In one embodiment, the data store 230 includes sensor data along with, for example, metadata that characterize various aspects of the sensor data. For example, the metadata can include location coordinates (e.g., longitude and latitude), relative map coordinates or tile identifiers, time/date stamps from when the separate sensor data was generated, and so on. In one embodiment, the data store 230 further includes radar information 240 that may include power, direction, angle, phase, time, and so on of returned or reflected radio waves. In one approach, the radio waves are millimeter, UWB, or other high-frequency waves that the detection system 170 utilizes to estimate object depth, density, and movement.

The detection module 220, in one embodiment, is further configured to perform additional tasks beyond controlling the respective sensors to acquire and provide the sensor data. For example, the detection module 220 includes instructions that cause the processor 110 to detect a person approaching the vehicle 100 for accessing a compartment. The person may be a pedestrian, operator, or passenger carrying an object. In various implementations, the object can be cargo, groceries, an animal, a child, a pet, a box, and so on for a compartment (e.g., trunk) of the vehicle 100.

Regarding locating and detecting objects, the vehicle 100 may use the radar sensor(s) 123 that emits radio waves from a transmitter. The radar system may measure returned radio waves using one or more transceivers placed within the cabin of the vehicle 100. In one approach, the emitted radio waves can be mmW, UWB, and so on that the detection system 170 uses to determine a presence of various materials by density differences. For example, the detection system 170 can use short wavelength and high-frequency (e.g., 60-70 GHz) mmW reflections to recognize human tissue and bone according to density. As given in more detail below, systems using mmW reflections can also detect more subtle depth and motion changes than monocular cameras, infrared sensors, capacitive sensors, lasers, ultrasonic sensors, and so on.

Figure 3:
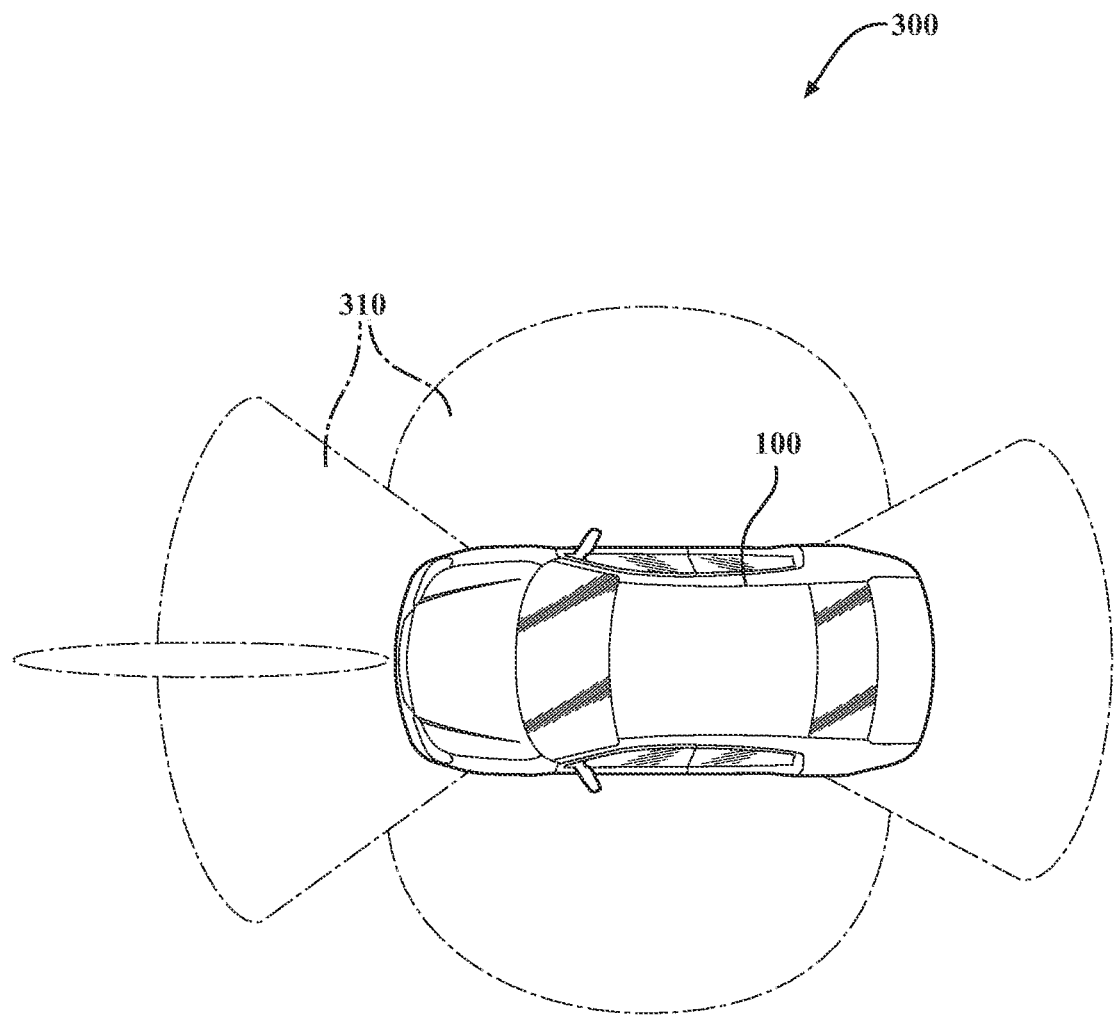
FIG. 3 illustrates a radar system of the vehicle used to identify and detect a person carrying an object.

As an example of the radar system, FIG. 3 illustrates the vehicle 100 detecting a person carrying an object using the radar system 300. In various implementations, the radar system 300 uses a single mmW device with antenna transceivers positioned within the vehicle cabin. For example, the single mmW device can use multiple transceivers pairs (e.g., 48) to detect returned waves emitted from a radar transmitter. In addition, the radar system 300 may also use such hardware to scan for objects externally and internally. According to returned waves, the detection system 170 may detect a person and object by estimating depth and control vehicle access accordingly. In particular, when a person approaches or walks towards the vehicle 100, the radar system 300 emits the waves 310 to detect densities and scan the person. The detection system 170 can use the radar information 240 measured from reflections of the emitted waves 310. As explained below, density and depth using a ML model may be estimated from the radar information 240.

In one approach, the detection system 170 uses mmW radar to see through, around, or penetrate objects at longer ranges and wide-viewing angles. Unlike cameras (e.g., monocular cameras), the penetration of radar waves allows the detection system 170 to also estimate depth in more detail. In addition, systems using mmW radar track objects precisely due to the temporal properties of high frequency waves. As such, mmW radiometry can be used for computer vision by differentiating and identifying subtle movements between people, pets, objects, vapors, liquids, metals, and so on. In particular, the dispersion properties for mammal tissue or bone of high-frequency (e.g., 60-70 GHz) radio waves allow mmW systems to distinguish varying materials from humans in detail. By comparing tissue density to detected density, the detection system 170 may detect a person near the vehicle 100. Furthermore, as explained below, the detection system 170 may combine the density information with estimated depth, thereby detecting a person carrying an object towards the vehicle 100.

Next, various implementations are given using depth perception to detect and track a person carrying an object and controlling access accordingly. The detection system 170 may compute pixels representing the 3D position of persons and objects using the radar information 240 and a ML model. In one approach, the radar system 300 can scan and provide acquired information to compute a point cloud or spatial point distribution. A point cloud is a set of data points associated with an object in space. Acquiring the information for computing the data points or pixels, in various implementations, involves the detection system 170 utilizing frequency-modulated continuous waves (FMCW). Returned FMCWs, such as mmWs, measured by the transceivers of the radar system 300 can indicate object locations within an area. For example, the detection system 170 scans a range of fast Fourier transforms (FFT) of radar information 240 produced by the radar system 300. Subsequent object motion or velocity may be determined by performing additional FFT computations on returned waves. Furthermore, the detection system 170 may determine the azimuth (i.e., angular direction) of each object referencing the fixed position of the radar system 300. In particular, the radar system 300 may measure the azimuth angle relative to returned waves at a cross-section of a transceiver unit.

Regarding modeling, a ML model for the depth perception may use a CNN, a deep neural network (DNN), and similar architectures. For example, a CNN outputs estimated depth associated with the radar measurements. The detection system 170 may use the estimated depth to compute voxels or box pixels (boxels). A voxel is a discrete element plotted in an X, Y, Z space of a 3D entity. A boxel may be a 3D pixel unit (e.g., cube) that is part of a 3D entity. The location, size, and amplitude may be characteristics of a voxel or a boxel. In one approach, the voxel amplitude represents object density computed according to high-frequency wave dispersion. As explained herein, distinguishing density allows the detection system 170 to determine the nature of the object by material, size, dimension, and so on carried by a person to control vehicle access.

Figure 4:
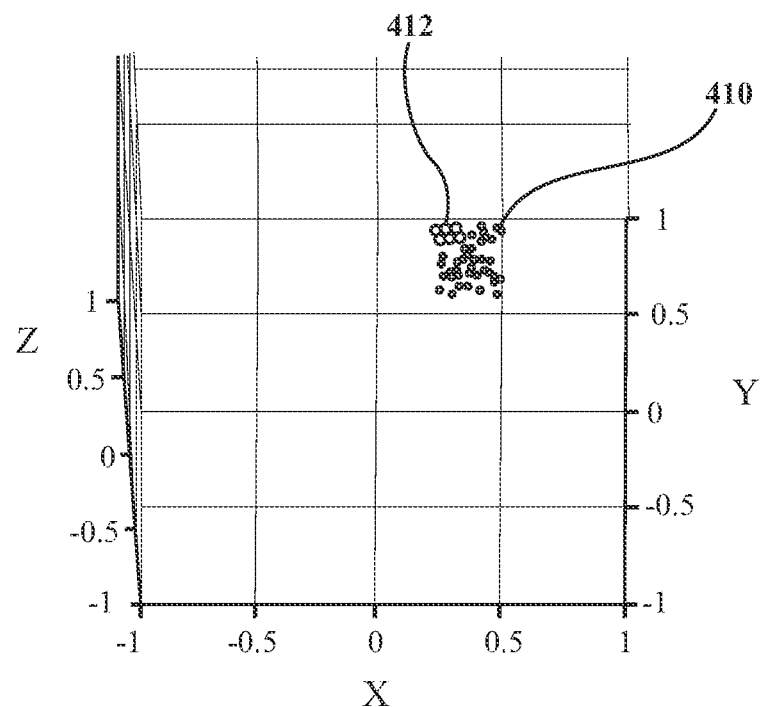
FIG. 4 illustrates an example of pixels representing estimated depth and detecting an occlusion.
Figure 4:
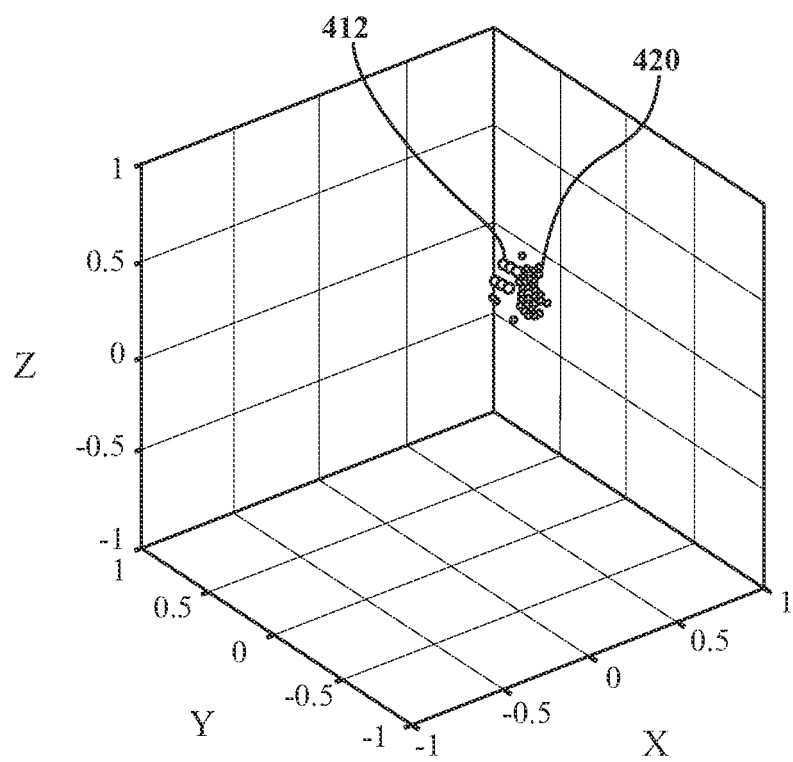

As illustrated in FIG. 4, grouped voxels 410, 412, and 420 in a plot may represent 3D depth used for identifying an object (e.g., person) being occluding by another object (412). In one approach, the detection system 170 computes the voxels 410 using measurements from returned mmWs. The detection system 170 may group (e.g., cluster) the voxels 412 or depth points to detect and track the objects. For example, changing position of depth points having consistent intensity in the last X frames may indicate a person moving with an occluding object. However, the detection system 170 may determine the absence of an object when intensity drops suddenly for grouped voxels or depth points. Accordingly, a person and object can be identified by tracking voxel position and intensity using the radar system 300.

Regarding more details on density detection, the detection system 170 can detect a person by performing material analysis from mmW based information. Using raw or adjusted radar information, the analysis may indicate an occlusion in the foreground according to the density differences. This task may also be combined with estimated depth to increase accuracy. For example, a cubical occlusion having a density of 1 $g/cm^3$ in front of a larger and thinner rectangle having a density of 985 $kg/m^3$ can be a person carrying a box. Furthermore, the detection system 170 may perform noise or error correction according to density differences. For instance, the density of cotton may be 1.54 $g/cm^3$. Since the density of cotton is similar to a box, the detection system 170 may determine that the approaching person is carrying laundry instead of a box.

Upon detection, occlusions may be labeled or classified by type according to shape and density. A type may be a box, groceries, a child, cargo, and so on. In the case of multiple objects, the detection system 170 may also group occlusions in a dataset to improve tracking. In the case of multiple objects, the dataset may be {small box, 1 $g/cm^3$, ($X_1$, $Y_1$, $Z_1$); laptop in bag, 2 $g/cm^3$, ($X_1$, $Y_1$, $Z_1$)}. In this way, access to a particular compartment is given by clustering object types, thereby allowing storage optimization.

Moreover, the detection system 170 can identify matter types using the position of the occlusion. For instance, the cubical occlusion with non-liquid core covering or obstructing a human torso can be a box. In other words, here an inanimate item is partially blocking the front or foreground of a person. The detection system 170 may make an inference and unlock a rear-cabin door or open a power liftgate for the person to store the inanimate item by combining this information with changing depth estimates of the voxels 410 or 412. Here, changing voxel positions having consistent intensity for an occlusion obstructing a person moving towards the vehicle 100 may confirm approaching cargo. Accordingly, the detection system 170 provides access with enhanced context and convenience by determining that the person is carrying a box using the density and estimated depth.

In various implementations, the detection system 170 performs additional steps for verification, convenience, and security associated with the vehicle access. For additional verification, the detection system 170 may compare the movement of the detected person and object to learned behavior, actions, or patterns. Referring to the prior example, a person carrying a voluminous box may have a certain pace and walk towards the rear of the vehicle 100. Such tracking and velocity may be derived and compared by the detection system 170 according to changes in estimated voxels 410, 412, or 420. The detection system 170 may also factor time to enhance and adjust pattern matching. For instance, a person may leave work carrying a briefcase or a gym carrying a bag at certain times-of-day. The detection system 170 may accordingly unlock or open a power liftgate factoring the pattern, the detected object, and the times-of-day. Besides convenience, placement of the voluminous box or gym bag in the rear may optimize fuel economy. This may be particularly beneficial to electric vehicles having range limitations. Furthermore, the detection system 170 may conveniently unlock or open the rear-cabin door instead of the power liftgate if a person is approaching the vehicle 100 holding a baby or walking a pet. However, the detection system 170 may open the operator door alone if a single person is approaching the vehicle 100 without carrying objects.

Regarding security, the detection system 170 may authorize access to a detected person carrying an object after receiving identification data from one of a mobile device, a digital key, and a key fob. For example, the detection system 170 may scan for an encrypted signal to unlock the vehicle and a person carrying an object concurrently. For increased security, the vehicle 100 unlocks access to a cabin door or trunk by verifying the identification data and detecting the person with an object. In addition, the detection system 170 may lock or close access after a timeout if an object is undetected in a compartment. For example, subsequent to giving the vehicle access, the radar system 300 may scan the trunk for a detected object carried by a person. The detection system 170 may lock the trunk after a timeout (e.g., four minutes) if the object is absent from the cargo area after a radar scan.

For additional convenience, the detection system 170 may perform tasks upon the exit of an occupant. The radar system 300, in various implementations, includes transceiver pairs to detect reflected waves in the cabin or trunk areas. As such, the detection system 170 may monitor and scan for objects stored internally using the ML model and operations given above. To distinguish objects, the detection system 170 may compare current scans against an initial baseline scan from when the vehicle 100 was empty. Similar to detection tasks externally, the detection system 170 may use the scanning data to determine density and compute voxels representing estimated depth for an internal space to improve tracking.

As an additional enhancement, the occupant leaving the vehicle 100 without an object that is normally removed may trigger a notification. The notification may be audible cues (e.g., a honk, an alarm, a voice message, etc.), visual cues (e.g., flashing lights, opening power liftgate, etc.), haptic cues (e.g., a vibrating phone, vibrating key fob, etc.), and so on. In particular, notifying the occupant by opening a cabin door may serve as a reminder and improve convenience. Once the object is removed, the detection system 170 may complete the sequence by automatically closing the cabin door. Furthermore, this determination may also include factoring in a particular destination related to the object. For instance, a food container in the vehicle from 7:30 AM-8:30 AM that is transported from home to work may be associated with lunch. As such, the vehicle 100 may speak "take lunch" when an occupant leaves without the food container. Accordingly, these tasks may improve convenience through increased automation of vehicle entry and exit.

Figure 5:
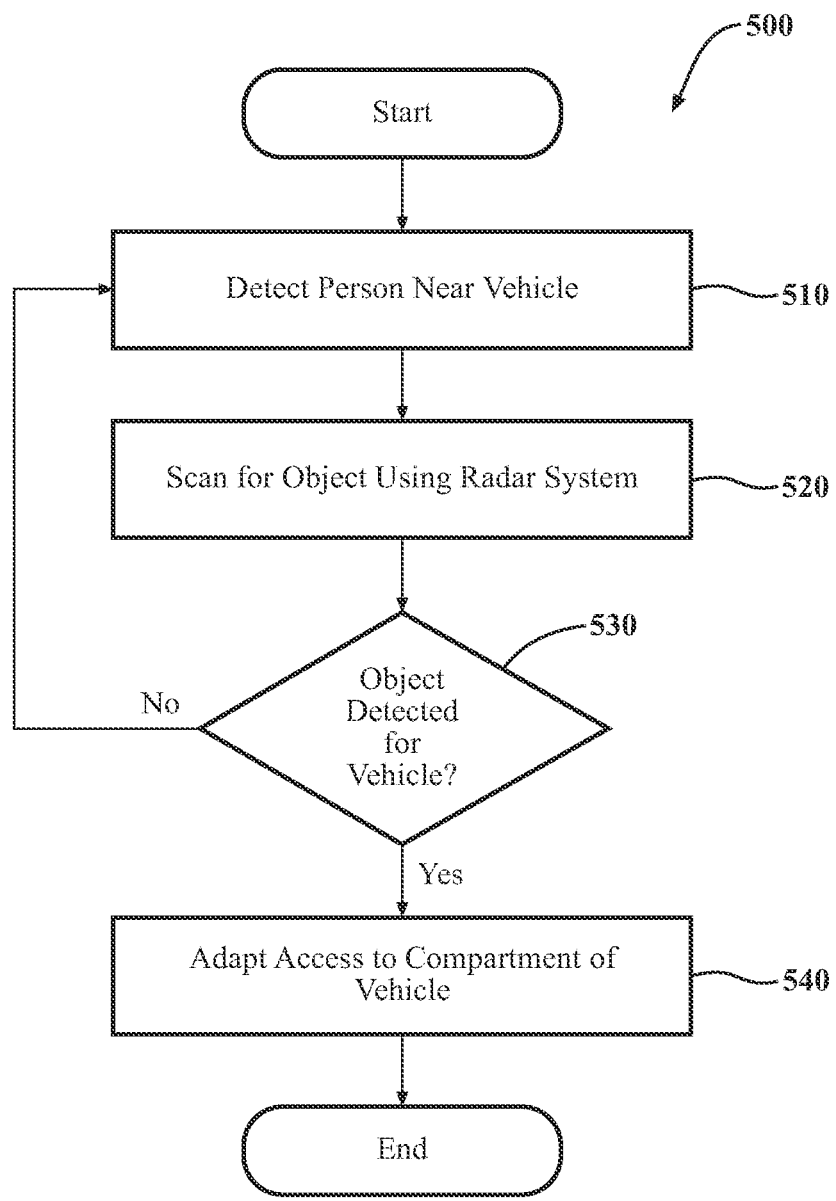
FIG. 5 illustrates one embodiment of a method that is associated with detecting a person carrying an object and adapting vehicle access according to the detection.

Additional aspects of detecting a person carrying an object will be discussed in relation to FIG. 5. FIG. 5 illustrates a flowchart of a method 500 that is associated with a person carrying objects and controlling vehicle access accordingly. Method 500 will be discussed from the perspective of the detection system 170 of FIGS. 1 and 2. While method 500 is discussed in combination with the detection system 170, it should be appreciated that the method 500 is not limited to being implemented within the detection system 170 but is instead one example of a system that may implement the method 500.

As such, at 510 the detection system 170 detects a person near the vehicle 100. For example, the radar system 300 emits the waves 310 (e.g., mmW or UWB waves) to detect density of a person around the vehicle 100. In one approach, the detection system 170 measures reflections of the emitted waves 310 using high-frequencies (e.g., 60-70 GHz). The dispersion properties for mammal tissue or bone of high-frequency radio waves allow systems to distinguish varying materials from humans with detail. By comparing tissue density to the detected density, the detection system 170 can detect a person near the vehicle 100. As explained above, such analysis may use raw radar information to indicate an occlusion in the foreground of the person according to the density differences.

Regarding further radar transmissions, at 520 the detection system 170 scans for an object using the radar system 300. For example, the radar system 300 measures returned FMCWs, such as mmWs, using transceivers in a vehicle cabin for locating objects. The detection system 170 may use the measured FMCWs for scanning objects using a range of FFTs. Subsequent object motion may be determined by performing additional FFT computations on returned FMCWs. Furthermore, the detection system 170 may determine the azimuth (i.e., angular direction) of each object by referencing the fixed position of the radar system 300. In particular, the radar system 300 may measure the azimuth angle relative to return waves at a cross-section of a transceiver unit.

As explained above, the detection system 170 may use depth perception to detect an object and control vehicle access accordingly. As such, at 530 the detection system 170 detects an object using density information and depth perception. The detection system 170 may estimate depth of a person and an object from the radar information and a ML model. For example, a CNN outputs estimated depth associated with radar measurements. Subsequently, the detection system 170 may use the estimated depth to compute voxels with characteristics of location, size, and amplitude. In one approach, the voxel amplitude may represent object density computed by the detection system 170.

Moreover, grouped voxels or depth points may represent 3D depth used for identifying the person and the object. In particular, the detection system 170 may group the 3D depth points to detect and track a person carrying an object. For example, changing position towards the vehicle 100 having consistent intensity can indicate a person with cargo approaching. However, the detection system 170 may determine the absence of an object when intensity drops suddenly for grouped voxels. Accordingly, a person and object can be identified by tracking voxel position and intensity.

In various implementations, the detection system 170 also combines density detection with estimated depth. For example, a cubical occlusion having 1 g/cm³ density in front of a larger and thinner rectangle having a 985 kg/m³ density may be a person carrying a box. Upon detection, occlusions may also be labeled by type. A type may be a box, groceries, a child, cargo, and so on. In the case of multiple objects, the detection system 170 may also group occlusions in a dataset to improve tracking. In the case multiple objects, the dataset may be {small box, 1 g/cm³, $(X_1, Y_1, Z_1)$; laptop in bag, 2 g/cm³, $(X_1, Y_1, Z_1)$}. In this way, access to a particular compartment is given by clustering object types, thereby optimizing storage.

For additional verification and convenience, the detection system 170 may also compare the movement of the detected person and object to learned behavior, actions, or patterns. For example, a person carrying a voluminous box may have a certain pace and walk towards the rear of the vehicle 100. Such tracking and velocity may be derived and compared by the detection system 170 according to changing voxels or depth points. As explained above, the detection system 170 may also factor time and geographic location to adjust pattern matching.

At 540, the detection system 170 adapts access to a compartment when detecting a person carrying cargo. For example, the detection system 170 can unlock a rear-cabin door or open a power liftgate for the person carrying a voluminous box to store. In another example, using a matched pattern and time, a person may leave work carrying a briefcase or a gym bag at certain times-of-day. The detection system 170 may accordingly unlock or open a power liftgate of the vehicle 100 factoring the pattern, the detected object, and the times-of-day. Furthermore, the detection system 170 may conveniently unlock or open the rear-cabin door instead of the power liftgate if a person is detected and approaching the vehicle 100 holding a baby. However, the detection system 170 may open the operator door alone if a single person is approaching the vehicle 100 without carrying objects.

FIG. 1 will now be discussed in full detail as an example environment within which the system and methods disclosed herein may operate. In some instances, the vehicle 100 is configured to switch selectively between different modes of operation/control according to the direction of one or more modules/systems of the vehicle 100. In one approach, the modes include: 0, no automation; 1, driver assistance; 2, partial automation; 3, conditional automation; 4, high automation; and 5, full automation. In one or more arrangements, the vehicle 100 can be configured to operate in a subset of possible modes.

In one or more embodiments, the vehicle 100 is an automated or autonomous vehicle. As used herein, "autonomous vehicle" refers to a vehicle that is capable of operating in an autonomous mode (e.g., category 5, full automation). "Automated mode" or "autonomous mode" refers to navigating and/or maneuvering the vehicle 100 along a travel route using one or more computing systems to control the vehicle 100 with minimal or no input from a human driver. In one or more embodiments, the vehicle 100 is highly automated or completely automated. In one embodiment, the vehicle 100 is configured with one or more semi-autonomous operational modes in which one or more computing systems perform a portion of the navigation and/or maneuvering of the vehicle along a travel route, and a vehicle operator (i.e., driver) provides inputs to the vehicle to perform a portion of the navigation and/or maneuvering of the vehicle 100 along a travel route.

The vehicle 100 can include one or more processors 110. In one or more arrangements, the processor(s) 110 can be a main processor of the vehicle 100. For instance, the processor(s) 110 can bean electronic control unit (ECU), and an application-specific integrated circuit (ASIC), a microprocessor, etc. The vehicle 100 can include one or more data stores 115 for storing one or more types of data. The data store(s) 115 can include volatile and/or non-volatile memory. Examples of suitable data stores 115 include RAM, flash memory, ROM, Programmable Read-Only Memory (PROM), Erasable Programmable Read-Only Memory (EPROM), Electrically Erasable Programmable Read-Only Memory (EEPROM), registers, magnetic disks, optical disks, and hard drives. The data store(s) 115 can be a component of the processor(s) 110, or the data store(s) 115 can be operatively connected to the processor(s) 110 for use thereby. The term "operatively connected," as used throughout this description, can include direct or indirect connections, including connections without direct physical contact.

In one or more arrangements, the one or more data stores 115 can include map data 116. The map data 116 can include maps of one or more geographic areas. In some instances, the map data 116 can include information or data on roads, traffic control devices, road markings, structures, features, and/or landmarks in the one or more geographic areas. The map data 116 can be in any suitable form. In some instances, the map data 116 can include aerial views of an area. In some instances, the map data 116 can include ground views of an area, including 360-degree ground views. The map data 116 can include measurements, dimensions, distances, and/or information for one or more items included in the map data 116 and/or relative to other items included in the map data 116. The map data 116 can include a digital map with information about road geometry.

In one or more arrangements, the map data 116 can include one or more terrain maps 117. The terrain map(s) 117 can include information about the terrain, roads, surfaces, and/or other features of one or more geographic areas. The terrain map(s) 117 can include elevation data in the one or more geographic areas. The terrain map(s) 117 can define one or more ground surfaces, which can include paved roads, unpaved roads, land, and other things that define a ground surface.

In one or more arrangements, the map data 116 can include one or more static obstacle maps 118. The static obstacle map(s) 118 can include information about one or more static obstacles located within one or more geographic areas. A "static obstacle" is a physical object whose position does not change or substantially change over a period of time and/or whose size does not change or substantially change over a period of time. Examples of static obstacles can include trees, buildings, curbs, fences, railings, medians, utility poles, statues, monuments, signs, benches, furniture, mailboxes, large rocks, or hills. The static obstacles can be objects that extend above ground level. The one or more static obstacles included in the static obstacle map(s) 118 can have location data, size data, dimension data, material data, and/or other data associated with it. The static obstacle map(s) 118 can include measurements, dimensions, distances, and/or information for one or more static obstacles. The static obstacle map(s) 118 can be high quality and/or highly detailed. The static obstacle map(s) 118 can be updated to reflect changes within a mapped area.

One or more data stores 115 can include sensor data 119. In this context, "sensor data" means any information about the sensors that the vehicle 100 is equipped with, including the capabilities and other information about such sensors. As will be explained below, the vehicle 100 can include the sensor system 120. The sensor data 119 can relate to one or more sensors of the sensor system 120. As an example, in one or more arrangements, the sensor data 119 can include information about one or more LIDAR sensors 124 of the sensor system 120.

In some instances, at least a portion of the map data 116 and/or the sensor data 119 can be located in one or more data stores 115 located onboard the vehicle 100. Alternatively, or in addition, at least a portion of the map data 116 and/or the sensor data 119 can be located in one or more data stores 115 that are located remotely from the vehicle 100.

As noted above, the vehicle 100 can include the sensor system 120. The sensor system 120 can include one or more sensors. "Sensor" means a device that can detect, and/or sense something. In at least one embodiment, the one or more sensors detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors may function independently or two or more of the sensors may function in combination. The sensor system 120 and/or the one or more sensors can be operatively connected to the processor(s) 110, the data store(s) 115, and/or another element of the vehicle 100. The sensor system 120 can produce observations about a portion of the environment of the vehicle 100 (e.g., nearby vehicles).

The sensor system 120 can include any suitable type of sensor. Various examples of different types of sensors will be described herein. However, it will be understood that the embodiments are not limited to the particular sensors described. The sensor system 120 can include one or more vehicle sensors 121. The vehicle sensor(s) 121 can detect information about the vehicle 100 itself. In one or more arrangements, the vehicle sensor(s) 121 can be configured to detect position and orientation changes of the vehicle 100, such as, for example, based on inertial acceleration. In one or more arrangements, the vehicle sensor(s) 121 can include one or more accelerometers, one or more gyroscopes, an inertial measurement unit (IMU), a dead-reckoning system, a global navigation satellite system (GNSS), a global positioning system (GPS), a navigation system 147, and/or other suitable sensors. The vehicle sensor(s) 121 can be configured to detect one or more characteristics of the vehicle 100 and/or a manner in which the vehicle 100 is operating. In one or more arrangements, the vehicle sensor(s) 121 can include a speedometer to determine a current speed of the vehicle 100.

Alternatively, or in addition, the sensor system 120 can include one or more environment sensors 122 configured to acquire data about an environment surrounding the vehicle 100 in which the vehicle 100 is operating. "Surrounding environment data" includes data about the external environment in which the vehicle is located or one or more portions thereof. For example, the one or more environment sensors 122 can be configured to sense obstacles in at least a portion of the external environment of the vehicle 100 and/or data about such obstacles. Such obstacles may be stationary objects and/or dynamic objects. The one or more environment sensors 122 can be configured to detect other things in the external environment of the vehicle 100, such as, for example, lane markers, signs, traffic lights, traffic signs, lane lines, crosswalks, curbs proximate the vehicle 100, off-road objects, etc.

Various examples of sensors of the sensor system 120 will be described herein. The example sensors may be part of the one or more environment sensors 122 and/or the one or more vehicle sensors 121. However, it will be understood that the embodiments are not limited to the particular sensors described.

As an example, in one or more arrangements, the sensor system 120 can include one or more of: radar sensors 123, LIDAR sensors 124, sonar sensors 125, weather sensors, haptic sensors, locational sensors, and/or one or more cameras 126. In one or more arrangements, the one or more cameras 126 can be high dynamic range (HDR) cameras, stereo, or infrared (IR) cameras.

The vehicle 100 can include an input system 130. An "input system" includes components or arrangement or groups thereof that enable various entities to enter data into a machine. The input system 130 can receive an input from a vehicle occupant. The vehicle 100 can include an output system 135. An "output system" includes one or more components that facilitate presenting data to a vehicle occupant.

The vehicle 100 can include one or more vehicle systems 140. Various examples of the one or more vehicle systems 140 are shown in FIG. 1. However, the vehicle 100 can include more, fewer, or different vehicle systems. It should be appreciated that although particular vehicle systems are separately defined, any of the systems or portions thereof may be otherwise combined or segregated via hardware and/or software within the vehicle 100. The vehicle 100 can include a propulsion system 141, a braking system 142, a steering system 143, a throttle system 144, a transmission system 145, a signaling system 146, and/or a navigation system 147. Any of these systems can include one or more devices, components, and/or a combination thereof, now known or later developed.

The navigation system 147 can include one or more devices, applications, and/or combinations thereof, now known or later developed, configured to determine the geographic location of the vehicle 100 and/or to determine a travel route for the vehicle 100. The navigation system 147 can include one or more mapping applications to determine a travel route for the vehicle 100. The navigation system 147 can include a global positioning system, a local positioning system, or a geolocation system.

The processor(s) 110, the detection system 170, and/or the automated driving module(s) 160 can be operatively connected to communicate with the various vehicle systems 140 and/or individual components thereof. For example, returning to FIG. 1, the processor(s) 110 and/or the automated driving module(s) 160 can be in communication to send and/or receive information from the various vehicle systems 140 to control the movement of the vehicle 100. The processor(s) 110, the detection system 170, and/or the automated driving module(s) 160 may control some or all of the vehicle systems 140 and, thus, may be partially or fully autonomous as defined by the society of automotive engineers (SAE) levels 0 to 5.

The processor(s) 110, the detection system 170, and/or the automated driving module(s) 160 can be operatively connected to communicate with the various vehicle systems 140 and/or individual components thereof. For example, returning to FIG. 1, the processor(s) 110, the detection system 170, and/or the automated driving module(s) 160 can be in communication to send and/or receive information from the various vehicle systems 140 to control the movement of the vehicle 100. The processor(s) 110, the detection system 170, and/or the automated driving module(s) 160 may control some or all of the vehicle systems 140.

The processor(s) 110, the detection system 170, and/or the automated driving module(s) 160 may be operable to control the navigation and maneuvering of the vehicle 100 by controlling one or more of the vehicle systems 140 and/or components thereof. For instance, when operating in an autonomous mode, the processor(s) 110, the detection system 170, and/or the automated driving module(s) 160 can control the direction and/or speed of the vehicle 100. The processor(s) 110, the detection system 170, and/or the automated driving module(s) 160 can cause the vehicle 100 to accelerate, decelerate, and/or change direction. As used herein, "cause" or "causing" means to make, force, compel, direct, command, instruct, and/or enable an event or action to occur or at least be in a state where such event or action may occur, either in a direct or indirect manner.

The vehicle 100 can include one or more actuators 150. The actuators 150 can be an element or a combination of elements operable to alter one or more of the vehicle systems 140 or components thereof responsive to receiving signals or other inputs from the processor(s) 110 and/or the automated driving module(s) 160. For instance, the one or more actuators 150 can include motors, pneumatic actuators, hydraulic pistons, relays, solenoids, and/or piezoelectric actuators, just to name a few possibilities.

The vehicle 100 can include one or more modules, at least some of which are described herein. The modules can be implemented as computer-readable program code that, when executed by a processor(s) 110, implement one or more of the various processes described herein. One or more of the modules can be a component of the processor(s) 110, or one or more of the modules can be executed on and/or distributed among other processing systems to which the processor(s) 110 is operatively connected. The modules can include instructions (e.g., program logic) executable by one or more processors 110. Alternatively, or in addition, one or more data stores 115 may contain such instructions.

In one or more arrangements, one or more of the modules described herein can include artificial intelligence elements, e.g., neural network, fuzzy logic or other machine learning algorithms. Furthermore, in one or more arrangements, one or more of the modules can be distributed among a plurality of the modules described herein. In one or more arrangements, two or more of the modules described herein can be combined into a single module.

The vehicle 100 can include one or more automated driving modules 160. The automated driving module(s) 160 can be configured to receive data from the sensor system 120 and/or any other type of system capable of capturing information relating to the vehicle 100 and/or the external environment of the vehicle 100. In one or more arrangements, the automated driving module(s) 160 can use such data to generate one or more driving scene models. The automated driving module(s) 160 can determine position and velocity of the vehicle 100. The automated driving module(s) 160 can determine the location of obstacles, obstacles, or other environmental features including traffic signs, trees, shrubs, neighboring vehicles, pedestrians, etc.

The automated driving module(s) 160 can be configured to receive, and/or determine location information for obstacles within the external environment of the vehicle 100 for use by the processor(s) 110, and/or one or more of the modules described herein to estimate position and orientation of the vehicle 100, vehicle position in global coordinates based on signals from a plurality of satellites, or any other data and/or signals that could be used to determine the current state of the vehicle 100 or determine the position of the vehicle 100 with respect to its environment for use in either creating a map or determining the position of the vehicle 100 in respect to map data.

The automated driving module(s) 160 either independently or in combination with the detection system 170 can be configured to determine travel path(s), current autonomous driving maneuvers for the vehicle 100, future autonomous driving maneuvers and/or modifications to current autonomous driving maneuvers based on data acquired by the sensor system 120, driving scene models, and/or data from any other suitable source such as determinations from sensor data. "Driving maneuver" means one or more actions that affect the movement of a vehicle. Examples of driving maneuvers include: accelerating, decelerating, braking, turning, moving in a lateral direction of the vehicle 100, changing travel lanes, merging into a travel lane, and/or reversing, just to name a few possibilities. The automated driving module(s) 160 can be configured to implement determined driving maneuvers. The automated driving module(s) 160 can cause, directly or indirectly, such autonomous driving maneuvers to be implemented. As used herein, "cause" or "causing" means to make, command, instruct, and/or enable an event or action to occur or at least be in a state where such event or action may occur, either in a direct or indirect manner. The automated driving module(s) 160 can be configured to execute various vehicle functions and/or to transmit data to, receive data from, interact with, and/or control the vehicle 100 or one or more systems thereof (e.g., one or more of vehicle systems 140).

Detailed embodiments are disclosed herein. However, it is to be understood that the disclosed embodiments are intended as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Furthermore, the terms and phrases used herein are not intended to be limiting but rather to provide an understandable description of possible implementations. Various embodiments are shown in FIGS. 1-5, but the embodiments are not limited to the illustrated structure or application.

The flowcharts and block diagrams in the figures illustrate the architecture, functionality, and operation of possible implementations of systems, methods, and computer program products according to various embodiments. In this regard, a block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components, and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein.

The systems, components, and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a ROM, an EPROM or Flash memory, a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Generally, modules as used herein include routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an ASIC, a hardware component of a system on a chip (SoC), as a programmable logic array (PLA), or as another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, radio frequency (RF), etc., or any suitable combination of the foregoing. Computer program code for carrying out operations for aspects of the present arrangements may be written in any combination of one or more programming languages, including an object-oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all combinations of one or more of the associated listed items. As an example, the phrase "at least one of A, B, and C" includes A, B, C, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A detection system for controlling access to a vehicle, comprising:
   a processor; and
   a memory storing instructions that, when executed by the processor, cause the processor to:
   detect a person near the vehicle to gain the access;
   scan the person for an object using a radar of the vehicle, wherein processing information from the radar indicates densities of the person and the object and voxels about the object; and
   upon detection of the object using the densities, unlock a compartment of the vehicle that can fit the object according to the voxels and depth points about the object that are grouped.

2. The detection system of claim 1, wherein the instructions to scan the person further include instructions to estimate, using a machine learning (ML) model, the depth points according to the information and detection of the object as an occlusion in a foreground associated with the person using the depth and the densities.

3. The detection system of claim 1, further including instructions to:
   compute, using a machine learning (ML) model, the voxels representing a volume of the object according to one of millimeter and ultra-wideband waves returned from the radar;
   track movement and intensities of the voxels associated with the object; and
   open the compartment according to the volume and patterns of the movement associated with the person.

4. The detection system of claim 3, further including instructions to:
   determine a label for the object according to the volume and the densities, wherein the label indicates a type of the object; and
   open a door on a condition that the label indicates the object as cargo.

5. The detection system of claim 1, further including instructions to:
   scan, by the radar subsequent to the unlock, the compartment for the object; and
   upon the person leaving the vehicle, initiate an alarm as a notification to take the object.

6. The detection system of claim 1, wherein the unlock includes one of: opening a trunk, opening a door, unlocking the trunk, and unlocking the door of the vehicle.

7. The detection system of claim 1, wherein the instructions to detect the person further include instructions to authorize the unlock using one of: identification data from a mobile device, a digital key, and a key fob.

8. The detection system of claim 1, wherein the densities indicate one of human tissue, bone, and liquid materials.

9. A non-transitory computer-readable medium for controlling access to a vehicle comprising:
   instructions that when executed by a processor cause the processor to:
   detect a person near the vehicle to gain the access;
   scan the person for an object using a radar of the vehicle, wherein processing information from the radar indicates densities of the person and the object and voxels about the object; and
   upon detection of the object using the densities, unlock a compartment of the vehicle that can fit the object according to the voxels and depth points about the object that are grouped.

10. The non-transitory computer-readable medium of claim 9, wherein the instructions to scan the person further include instructions to estimate, using a machine learning (ML) model, the depth points according to the information and detection of the object as an occlusion in a foreground associated with the person using the depth and the densities.

11. The non-transitory computer-readable medium of claim 9, further including instructions to:
    compute, using a machine learning (ML) model, the voxels representing a volume of the object according to one of millimeter and ultra-wideband waves returned from the radar;
    track movement and intensities of the voxels associated with the object; and
    open the compartment according to the volume and patterns of the movement associated with the person.

12. The non-transitory computer-readable medium of claim 11, further including instructions to:
    determine a label for the object according to the volume and the densities, wherein the label indicates a type of the object; and
    open a door on a condition that the label indicates the object as cargo.

13. A method comprising:
    detecting a person near a vehicle for gaining access;
    scanning the person for an object using a radar of the vehicle, wherein processing information from the radar indicates densities of the person and the object and voxels about the object; and
    upon detecting the object using the densities, unlocking a compartment of the vehicle that can fit the object according to the voxels and depth points about the object that are grouped.

14. The method of claim 13, wherein scanning the person further includes estimating, using a machine learning (ML) model, the depth points according to the information and detecting the object as an occlusion in a foreground associated with the person using the depth and the densities.

15. The method of claim 13, further comprising:
    computing, using a machine learning (ML) model, the voxels representing a volume of the object according to one of millimeter and ultra-wideband waves returned from the radar;
    tracking movement and intensities of the voxels associated with the object; and
    opening the compartment according to the volume and patterns of the movement associated with the person.

16. The method of claim 15, further comprising:
    determining a label for the object according to the volume and the densities, wherein the label indicates a type of the object; and
    opening a door on a condition that the label indicates the object as cargo.

17. The method of claim 13, further comprising:
    scanning, by the radar subsequent to the unlock, the compartment for the object; and
    upon the person leaving the vehicle, initiating an alarm as a notification to take the object.

18. The method of claim 13, wherein the unlock includes one of:
opening a trunk, opening a door, unlocking the trunk, and unlocking the door of the vehicle.

19. The method of claim 13, wherein detecting the person further includes authorizing unlocking of the compartment using one of: identification data from a mobile device, a digital key, and a key fob.

20. The method of claim 13, wherein the densities indicate one of human tissue, bone, and liquid materials.

* * * * *